United States Patent [19]
Fremont

[11] 4,256,630
[45] Mar. 17, 1981

[54] ACTIVATED SLUDGE TREATMENT

[75] Inventor: Henry A. Fremont, Wyoming, Ohio

[73] Assignee: Champion International Corporation, Stamford, Conn.

[21] Appl. No.: 43,359

[22] Filed: May 29, 1979

Related U.S. Application Data

[63] Continuation of Ser. No. 752,261, Dec. 14, 1976, abandoned, which is a continuation-in-part of Ser. No. 633,122, Nov. 18, 1975, abandoned.

[51] Int. Cl.³ .............................................. C02F 11/14
[52] U.S. Cl. .............................. 260/112 R; 210/710; 210/737; 210/768; 210/905; 210/928
[58] Field of Search .................... 210/10, 12, 51, 56, 210/66, 67, 71; 426/656, 657, 807; 260/112 R

[56] References Cited
U.S. PATENT DOCUMENTS

| | | | |
|---|---|---|---|
| 2,742,359 | 4/1956 | Rahn | 426/656 |
| 3,649,534 | 3/1972 | Schotte | 210/10 |

OTHER PUBLICATIONS

Wilson et al., *A Practical Solution of the Problem of Dewatering Activated Sludge*, Ind. & Eng. Chem., vol. 15, No. 9, (Sep. 1973), pp. 956–959.

*Primary Examiner*—Ivars C. Cintins
*Attorney, Agent, or Firm*—Evelyn M. Sommer

[57] ABSTRACT

The method of treating an activated sludge to facilitate dewatering thereof comprising the steps of acidifying the sludge to a pH below about 2.2, heating the acidified sludge to a temperature of from about 150° to 210° F. and maintaining the sludge at said temperature for a period of time sufficient to obtain a settling rate of solids in the first three minutes of at least two-sixteenths inch per minute.

10 Claims, 2 Drawing Figures

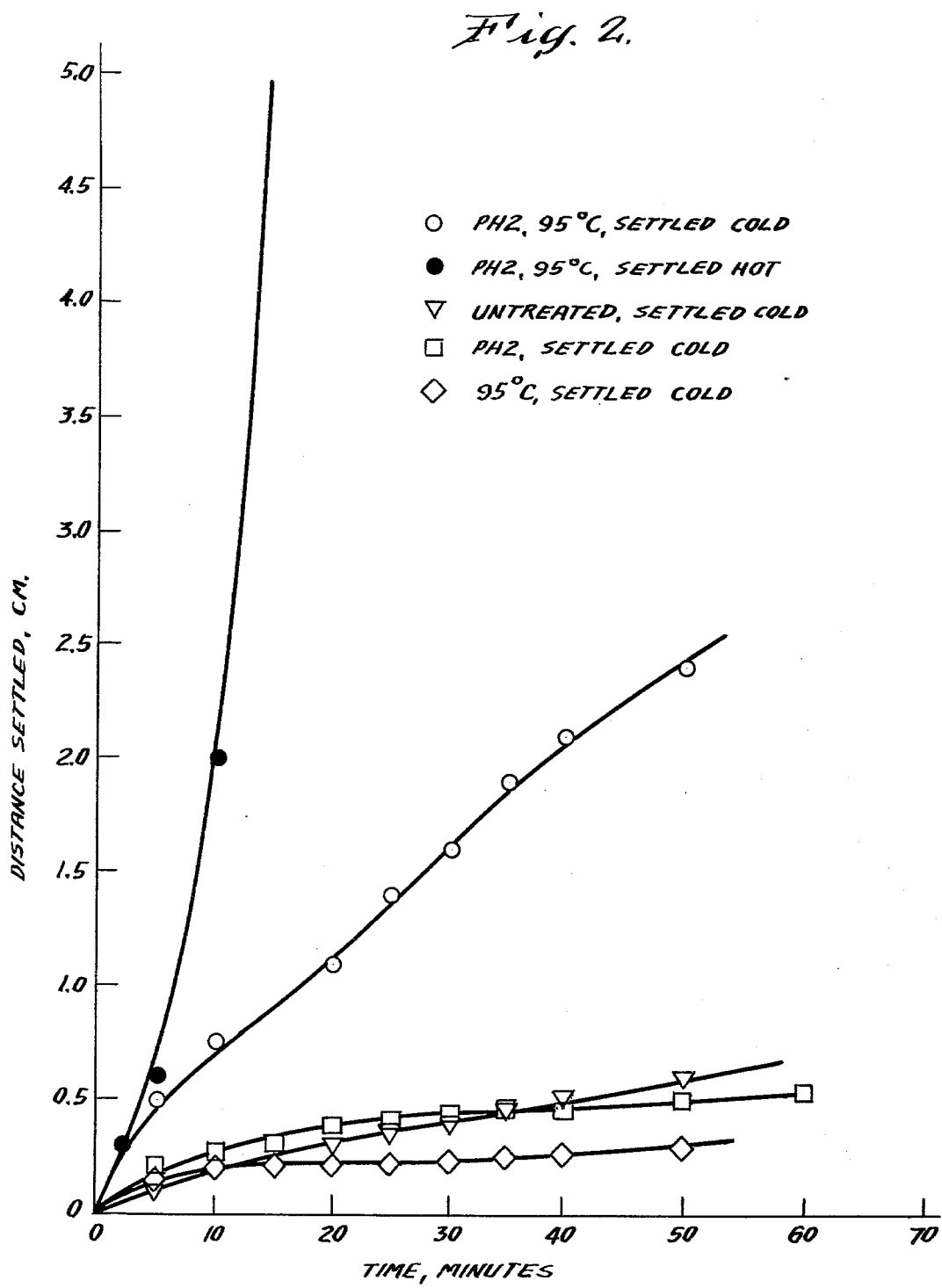

ACTIVATED SLUDGE TREATMENT

This is a continuation of application Ser. No. 752,261 filed Dec. 14, 1976 which in turn is a continuation-in-part of application Ser. No. 633,122 filed Nov. 18, 1975, both now abandoned.

BACKGROUND OF THE INVENTION

A common method for the treatment of municipal and plant sewage wastes is the activated sludge process in which large numbers of microorganisms are present, and, in fact, necessary, to treat the sewage. Such systems generally comprise a rapid flocculation of the materials in the biomass followed by their entrapment and subsequent settling and the reduction of the sludge liquor Biological Oxygen Demand (B.O.D.).

One problem, however, has been the disposal of the waste activated sludge. Not all of it can be returned to the above-described process. This is further complicated by the fact that the activated sludge, containing as it does large numbers of organisms of which apparently the genus Zoogloea seems to predominate, is very difficult to dewater because of the water-retention properties of the polysaccharides and other polymeric materials that are part of the capsular material surrounding the microorganic cells. As a consequence, the sludge is slimy and it is not possible to readily dewater such sludges to build up high solids materials that can be readily disposed of. In addition, the sludges after the limited dewatering heretofore possible, still give off unpleasant odors limiting their use or mode of disposal.

Efforts to treat activated sludge to facilitate the dewatering have included heat treatment. This has not proven satisfactory in that such heating usually results in solubilization of some of the sludge solids so that the resulting liquor produced has a high B.O.D. and has to be further treated before it can be discharged to a watercourse.

Other efforts have involved adding materials to the activated sludge, such as fly ash, and using this as a means to trap the solids to obtain liquors having a low B.O.D. This is expensive in terms of materials and energy involved in compressing the resulting mass and, further, still does not result either in a high solids material or a liquor with a sufficiently low B.O.D.

SUMMARY OF THE INVENTION

An improved process has now been found which can be used to permit the easy and rapid dewatering of activated sludge in an economical manner to produce high solids sludges that are no longer slimy and have no strong, unpleasant odor and yield a liquor having low B.O.D.

Briefly stated, the present invention comprises the method of treating an activated sludge to facilitate dewatering thereof comprising the steps of acidifying the sludge to a pH below about 2.2, heating the acidified sludge to a temperature of from about 150°–210° F. and maintaining the sludge at said temperature for a period of time sufficient to obtain a settling rate of solids in the first three minutes of at least two-sixteenths inch per minute, ordinarily about 10 to 60 minutes. Water may thereafter be removed from the sludge quite easily.

Sludge treated in accordance with this process is transformed from its initially slimy or gelatinous consistency to a friable solid one. At the same time, inorganics—most importantly, heavy metals—are preferentially removed. This produces a protein-rich sludge product useful inter alia as a soil fertilizer or animal feed source.

DETAILED DESCRIPTION

Figure 1:
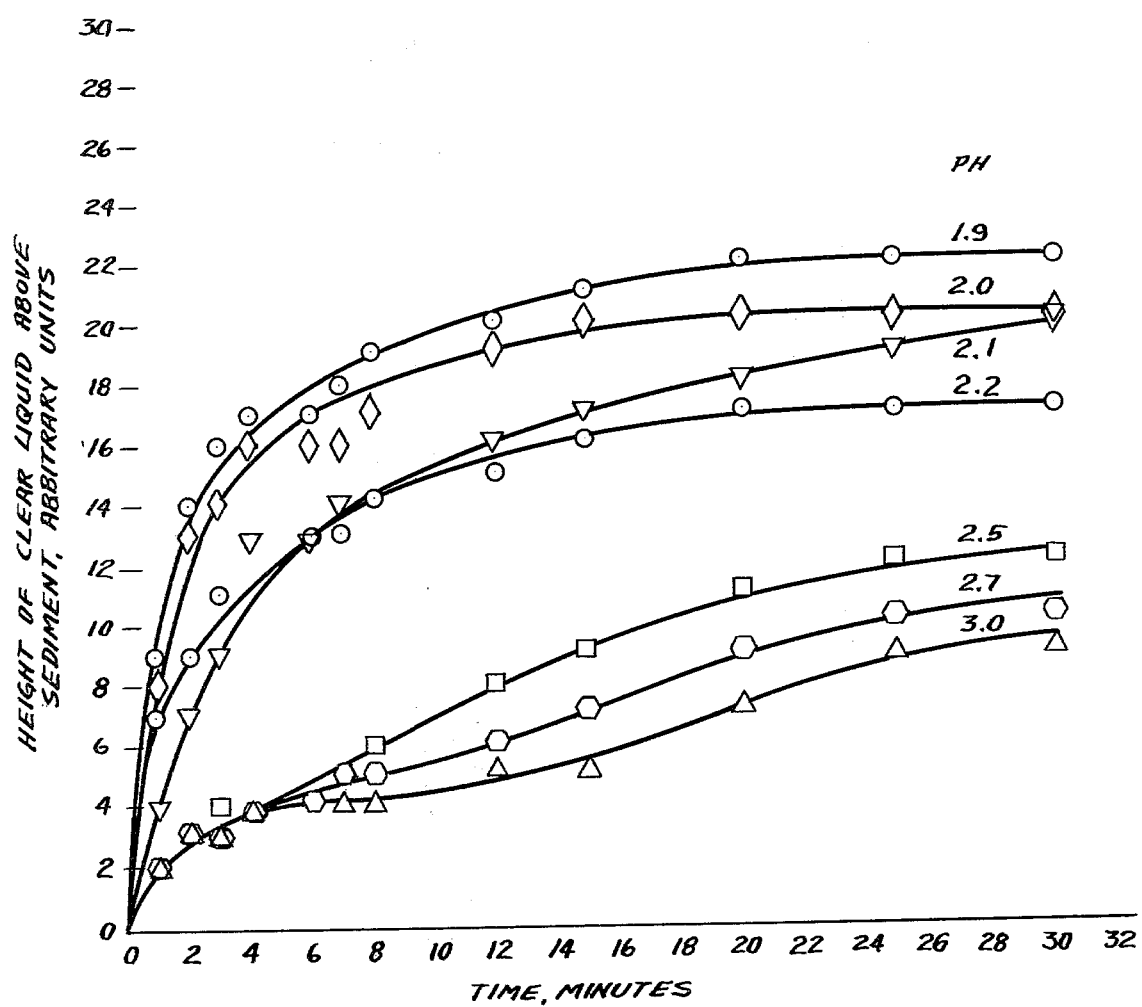

The process of the instant invention is applicable to the treatment of all activated sludges. As used herein, the term "activated sludge" is meant to include all types of activated sludges that result from the various activated sludge processes used to treat municipal and industrial sewage wastes. Studies of such wastes indicate that *Zoogloea ramigera* is apparently the predominant organism in activated sludge, and it has been found that the capsular material surrounding such cells is a fibrillar polysaccharide polymer. Other studies have indicated these polysaccharides and other polymers are a major factor in the physical behavior of sludge.

In the process of the instant invention, the essential and necessary steps are the acidification of the sludge prior to heating and the maintenance of a specific temperature for a related period of time.

While the instant process is applicable to treatment of activated sludge without concentration, for the sake of economical operation, it is preferred to increase the solids to about 4%. Ordinarily, sludge has a solids content below 2%. This concentration can be effected by simply permitting the sludge to first pass through a conventional settling tank or clarifier where the solids can be increased to about 4% and the supernatant disposed of by being either first recirculated to the clarifier or stabilization tank present in sludge treatment or, if the B.O.D. of the supernatant is sufficiently low, it can be disposed of directly into the lake, river, or other watercourse.

The acid added to achieve the desired pH is preferably a mineral acid, such as hydrochloric or sulfuric. While other acids, such as phosphoric, can be used, again for cost reasons, it is not preferred. Sufficient acid is added to achieve at least a pH of 2.2 or below, preferably a pH of 1.8 to 2.0 for optimum results. Still lower pH values also achieve the improved results of this invention. Because of the highly buffered nature of sludges, however, the added expense of these still lower pH values is not ordinarily warranted.

It is sufficient to meter the acid into the sludge as it is conveyed to the heating zone, as described below, and use conventional pH meters to monitor the acidified sludge to insure that the proper pH levels are reached and maintained.

The temperature of the acidified sludge is then raised to from about 150° to 210° F. and maintained at said temperature for a period of time sufficient to obtain a settling rate of solids in the first 3 minutes of at least two-sixteenths inch per minute. Such heating is preferably carried out using any conventional heater. As to temperature, it is important not to exceed boiling temperatures since this tends to solubilize some of the biologic materials in the sludge and thus increase the B.O.D. of the liquor obtained during subsequent dewatering. While temperatures below 150° F. can be used, they are not economically practical in that the time at which the sludge must be maintained at such temperature is inordinately increased.

Treatment time at temperature ordinarily will range from about 10 to 60 minutes depending upon the particular type of sludge treated and the concentration of solids in the sludge. The particular treatment time or temperatures to be used can be readily determined by running a series of the standard settling rate test on sludges treated under the conditions noted above and determining these conditions giving the optimum settling rate of at least two-sixteenths of an inch per minute for the first three minutes.

As previously set forth, a settling rate of solids in the first three minutes of at least two-sixteenths of an inch per minute is an indication of the fact that adequate time at temperature has been maintained to insure that the water can be readily removed from the sludge. Not only it is undesirable to use temperatures that are too high, but it is believed that maintaining the temperature for too long a period of time may also act to solubilize some of the materials in the sludge again leading to a liquor after dewatering having an unsuitably high B.O.D.—i.e. one higher than that customary for the secondary stage effluent of an activated sludge process. For this reason, it is preferred to dewater the pre-treated sludge promptly—most preferably within about one hour—after such a settling rate has been obtained.

After acidification and heating have been completed, the sludge can then be passed through any conventional dewatering apparatus to separate out the solids and to give a low B.O.D. liquor. Dewatering is best accomplished before the sludge has cooled significantly. Performing the separation of water from solids at a temperature of between about 150° F. and 210° F. ensures retention of an optimum settling rate. While centrifugation can give suitable results, it is preferred to use vacuum filtration apparatus with, for example, any of the usual commercial in-line types being suitable.

By carrying out the process of the instant invention, it is possible to obtain, without any difficulty, dewatered sludges that are non-slimy, friable, and have a solids content of at least about 30% by weight. This product is readily distinguishable from the solids of the sludge starting material and from sludges dewatered by prior art techniques. Those sludge solids are gelatinous and slimy.

This change in physical consistency appears largely to arise from the effect of the conditions of this invention upon the organisms present in activated sludges. The capsular materials, surrounding these microorganic cells and forming water-retentive matrixes, are collapsed pursuant to this invention. This transforms the solids into a different physical composition similar in form to natural earth soil. Hence, it may more readily be treated, or disposed of, as desired.

Another manner in which sludge dewatered by the present invention is improved resides in its ash content. Because the only treating agents required are acids, dewatering may substantially reduce the content of ash in the solids. This increases the proportion of protein in the treated product.

Moreover, the composition of this ash residue is also improved. Under the instant conditions of dewatering, heavy metals—particularly zinc, chromium, nickel and the like—are leached from the sludge solids in disproportionate quantities. This reduces toxicity, making the sludge still more desirable as a source of beneficial land fill or fertilizer.

In one preferred embodiment of use, for example, the dewatered sludge solids are neutralized and used as landfill or fertilizer. Neutralization is best performed through addition of sufficient ammonia or ammonium to raise the pH to about 7. This both renders the solids compatible with vegetation and provides nitrogen enrichment.

In another optional embodiment, the dewatered sludge is extracted to isolate its protein content. Sludge dewatered in accordance with this invention is particularly rich in protein. It therefore constitutes an excellent source of protein useful as a food for animals or for industrial use.

Extraction of protein may be accomplished by means known in the art. One such means is mechanical separation of protein. This may, for example, be accomplished by subjecting dewatered sludge to physical disruption in a homogenizer, filtering off the resultant cell wall debris, and then treating the freed intracellular material by ultrafiltration through a membrane of about 20 Å pore size. This produces a permeate containing low molecular weight carbohydrates and inorganic salts. The corresponding retentate comprises the protein fraction which may, if desired, then be dried.

In an alternative and preferred extraction, chemical means are utilized for separation of protein. Most desirably, this involves the use of a solvent, such as concentrated urea, to solubilize the proteins from intracellular material. A general such technique is set forth by Mitsuda et al in an article entitled "A New Method for Obtaining Protein Isolates From Chlorella Algae, Torula Yeasts And Other Microbial Cells", *Chemical Engineering*, Chemical Engineering Progress Symposium series, (Number 93, volume 65). It has, however, been discovered that concentrations above those of that article—i.e. above 8 M—of urea provide optimum yields of protein.

Significantly, the protein isolated from dewatered sludges contains amino acid constituents in much the same proportions as those of more conventional proteins mixtures such as casin. This protein may therefore be substituted in many applications which have employed those expensive and less plentiful materials.

The invention will be further described in connection with the following examples which illustrate the best modes currently contemplated for carrying out the instant invention but which must not be construed as limiting the invention in any manner whatsoever. Unless otherwise specified herein, all percentages and ratios are provided on the basis of weight.

EXAMPLE 1

Activated sludge, having 0.88% suspended solids, to be disposed of and resulting from the secondary treatment of combined waste water from a municipality and a pulp and paper mill was first permitted to settle for twenty-four hours to increase the suspended solids content thereof. The resultant sludge concentrate had 2.46% suspended solids.

To this sludge was added sufficient sulfuric acid to adjust the pH to 2.2 and the acidified sludge was then heated to 200° F. and maintained at that temperature for sixty minutes.

The acidified and heated sludge was then readily vacuum filtered to form a dewatered sludge cake having a solids content of 25.6%. The liquid filtrate was clear with no suspended solids.

EXAMPLES 2 TO 4

An activated sludge from the same source as that set forth in Example 1, but having a suspended solids content, after settling, of 1.5% was treated for comparative purposes in three different procedures:
 (a) In accordance with the present invention;
 (b) Without acidification, and (c) Without adequate heating.

The test conditions and results are set forth in Table I below:

TABLE I

| Ex. No. | pH | Temp., °F. | Time, Minutes at Temp. | Filter Cake Wet Grams | Filter Cake Dry Grams | % O.D. |
|---|---|---|---|---|---|---|
| 2 | 2.2 | 200 | 20 | 310 | 56.4 | 18.2 |
| 3 | 6.8 | 200 | 10 | Filtered too slow to count | | |
| 4 | 2.2 | 80 | 32 | Filtered too slow to count | | |

EXAMPLE 5

An activated sludge from the same source as that used in Example 1, but having 0.5% suspended solids was allowed to settle for 24 hours, the supernated liquid removed and the sludge concentrate having 2% suspended solids further treated.

Hydrochloric acid was used to adjust the pH of the sludge to 2 and the sludge heated at 190° F. for 10 minutes. The thus treated sludge was then filtered by a vacuum filter to form sludge filter cakes having 40% by weight solids concentration. The cake was not slimy and had good consistency.

EXAMPLE 6

An activated sludge from the same source as that used in Example 1 was allowed to settle for twenty-four hours and the resultant sludge concentrate had 1.9% suspended solids and a pH of 6.9. Seven identical samples of the concentrated sludge were titrated with 1 N sulfuric acid to pH's, respectively, of 3.0, 2.7, 2.5, 2.2, 2.1, 2.0, and 1.9. Each of the seven samples were heated for sixty minutes at a temperature of 208° F. After being heated, the samples were allowed to cool, stirred and a settling test conducted thereon. Each of the samples was tested for settling by being placed in individual 2000 ml. graduated cylinders and the height of the settled solids measured at the end of each minute for the first four minutes and at regular intervals thereafter for a period of thirty minutes. The results of such settling rate test are set forth in Table II below.

TABLE II

| pH | Time-Minutes | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 12 | 15 | 20 | 25 | 30 |
| 3.0 | 0 | 2 | 3 | 3 | 4 | — | 4 | 4 | 4 | — | — | 5 | 5 | 7 | 9 | 9 |
| 2.7 | 0 | 2 | 3 | 3 | 4 | — | 4 | 5 | 5 | — | — | 6 | 7 | 9 | 10 | 10 |
| 2.5 | 0 | 2 | 3 | 4 | 4 | — | 4 | 5 | 6 | — | — | 8 | 9 | 11 | 12 | 12 |
| 2.2 | 0 | 7 | 9 | 11 | 13 | — | 13 | 13 | 14 | — | — | 15 | 16 | 17 | 17 | 17 |
| 2.1 | 0 | 4 | 7 | 9 | 13 | — | 13 | 14 | 14 | — | — | 16 | 17 | 18 | 19 | 20 |
| 2.0 | 0 | 8 | 13 | 14 | 16 | — | 16 | 16 | 17 | — | — | 19 | 20 | 20 | 20 | 20 |
| 1.9 | 0 | 9 | 14 | 16 | 17 | — | 17 | 18 | 19 | — | — | 20 | 21 | 22 | 22 | 22 |

As is further evident from the graphical depiction of this data in FIG. I, the settling rate at a pH of 2.2 or less is both much greater and more quickly obtained than at higher pH values.

EXAMPLE 7

Activated sludge from the same source as that used in Example 1 was allowed to settle for twenty-four hours. The resultant sludge concentration contained 1.9% suspended solids and had a pH of 6.9. Five identical samples were separated. Various of these samples were then acidified, heated or held for thirty minutes prior to being dewatered at high or ambient temperatures as indicated below:

TABLE III

| Pretreatment Sample No. | Pretreatment and Temperature | Dewatering pH | Dewatering Temperature |
|---|---|---|---|
| 1 | 210° F. | 2.0 | 210° F. |
| 2 | 210° F. | 2.0 | 50° F. |
| 3 | 50° F. | 6.9 | 50° F. |
| 4 | 50° F. | 2.0 | 50° F. |
| 5 | 210° F. | 6.9 | 50° F. |

The settling rates for these samples are graphically depicted in FIG. II. There, it is evident that sludges which were not subjected to both elevated temperature and low pH possessed significantly slower settling rates than samples treated in accordance with the present invention.

By comparing the results from samples 1 and 2, FIG. II shows the preference for dewatering pretreated sludge at elevated temperature. Further, these same samples show that the pretreatment is not merely an optimization of conditions of separation of water. The fact that the settling rates remains substantially higher than normal, even if pretreated sludge is later cooled, reflects the physical/chemical alteration ingendered pursuant to pretreatment at elevated temperature and low pH.

EXAMPLE 8

Dewatered protein solids produced in accordance with the process of Example 1 was subjected to protein extraction. This was done by homogenizing the solid, removing the insoluble cell wall debris by filtration, and subjecting the remaining sludge material to ultrafiltration through a 20 Å pore size membrane.

Analysis of the retentate revealed that nucleoprotein in excess of 10% of the initial feed was recovered. This protein—as reflected in the comparitive table below—was quite similar to that obtained from conventional sources.

TABLE IV

| Amino Acid | Sludge | Casin | Soy | Peanut |
|---|---|---|---|---|
| Lysine | 6.0 | 7.6 | 4.2 | 3.4 |
| Histidine | 1.7 | 2.1 | 2.5 | 2.1 |
| Arginine | 6.5 | 4.3 | 6.9 | 10.6 |
| Aspartic | 7.3 | 6.1 | 10.6 | 5.8 |
| Threonine | 5.6 | 3.8 | 2.8 | 2.9 |
| Serine | 4.7 | 7.7 | 5.1 | — |
| Glutamic Acid | 18.4 | 23.3 | 17.6 | 19.2 |
| Proline | 3.8 | 7.5 | 5.2 | — |
| Glycine | 7.3 | 0.5 | 4.0 | 5.6 |
| Alanine | 10.0 | 5.5 | 4.1 | 4.2 |
| Cystine | 0.5 | 0.4 | 2.2 | 1.9 |
| Valine | 6.4 | 6.5 | 4.2 | 8.0 |
| Methionine | 2.9 | 3.4 | 2.2 | 1.2 |
| Isoleucine | 4.9 | 6.3 | 4.2 | 4.3 |
| Leucine | 8.2 | 9.7 | 4.8 | 7.0 |
| Tyrosine | 4.2 | 6.7 | 2.8 | 5.4 |
| Phenylalanine | 5.0 | 5.0 | 2.8 | 5.4 |

TABLE IV-continued

| Amino Acid | Sludge | Casin | Soy | Peanut |
| --- | --- | --- | --- | --- |
| Tryptophan | 1.4 | 1.2 | 1.4 | 2.0 |

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. The method of treating an activated sludge from a municipal or a pulping operating or combination thereof, comprising the steps of acidifying the sludge to a pH below about 2.2, heating the acidified sludge to a temperature of from about 150°–210° F. and maintaining the sludge at such conditions for a period of time sufficient to obtain a settling rate of solids in the first three minutes of at least two-sixteenths inch per minute to facilitate dewatering.

2. The method of claim 1, wherein the acidification is to a pH of from 1.8 to 2.0 by means of a mineral acid selected from hydrochloric and sulfuric acid.

3. The method of claim 2, wherein the treated sludge is de-watered to separate sludge solids.

4. The method of claim 3, wherein protein is extracted from the separated sludge solids.

5. The method of claim 2, wherein the acidified sludge is heated at a temperature of from 190°–200° F. for a period of from 10 to 60 minutes.

6. The method of claim 1, wherein the acidified sludge is heated at a temperature of from 190°–200° F. for a period of from 10 to 60 minutes.

7. The method of claim 1, wherein water is separated from the treated sludge.

8. The method of claim 7, wherein water is separated from sludge at a temperature between about 150° and 210° F.

9. The method of claim 8 wherein the water is separated within one hour after treatment of the sludge.

10. The process of claim 9 wherein the dewatered sludge is neutralized to a pH of about 7.

* * * * *